United States Patent Office 3,289,841

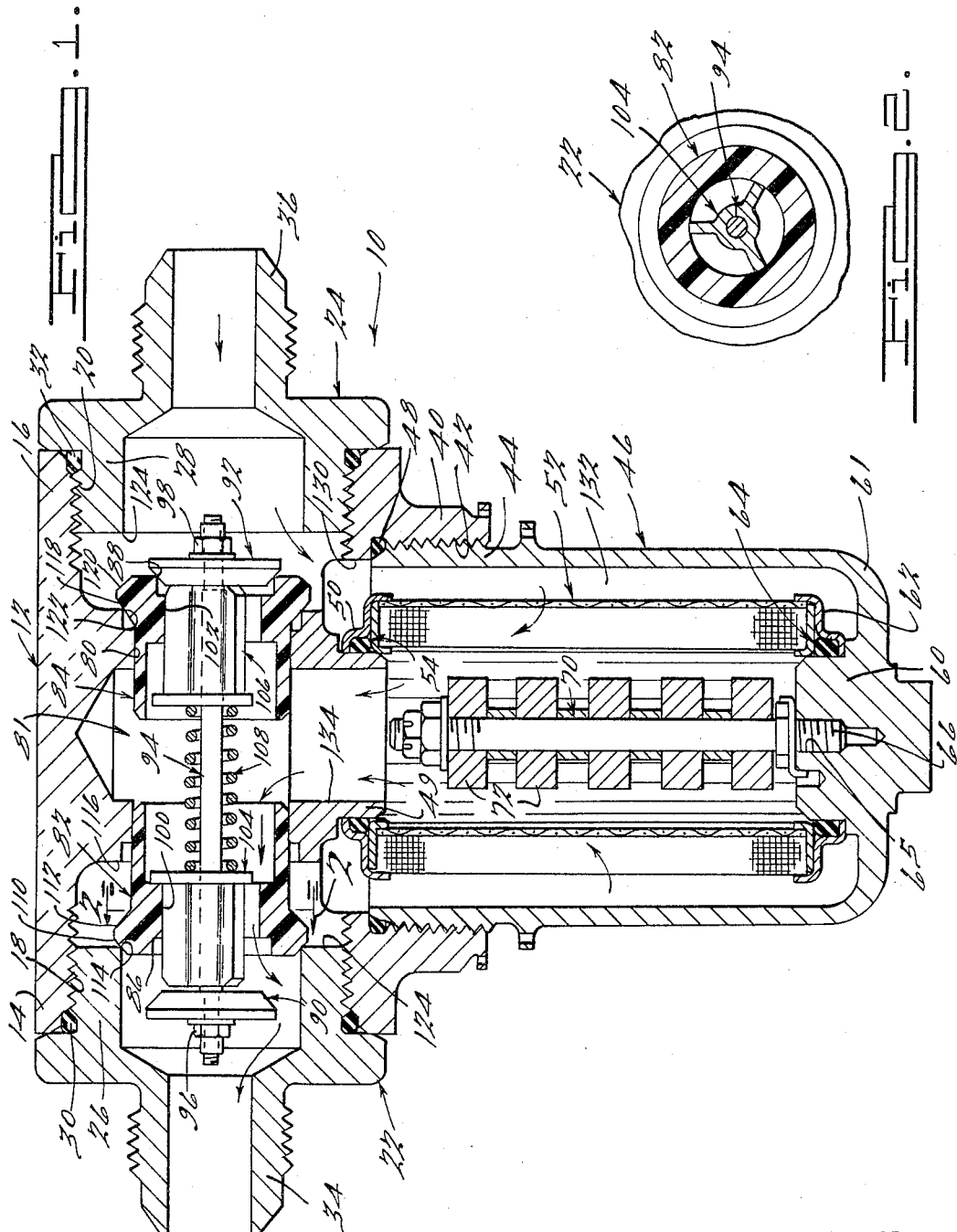

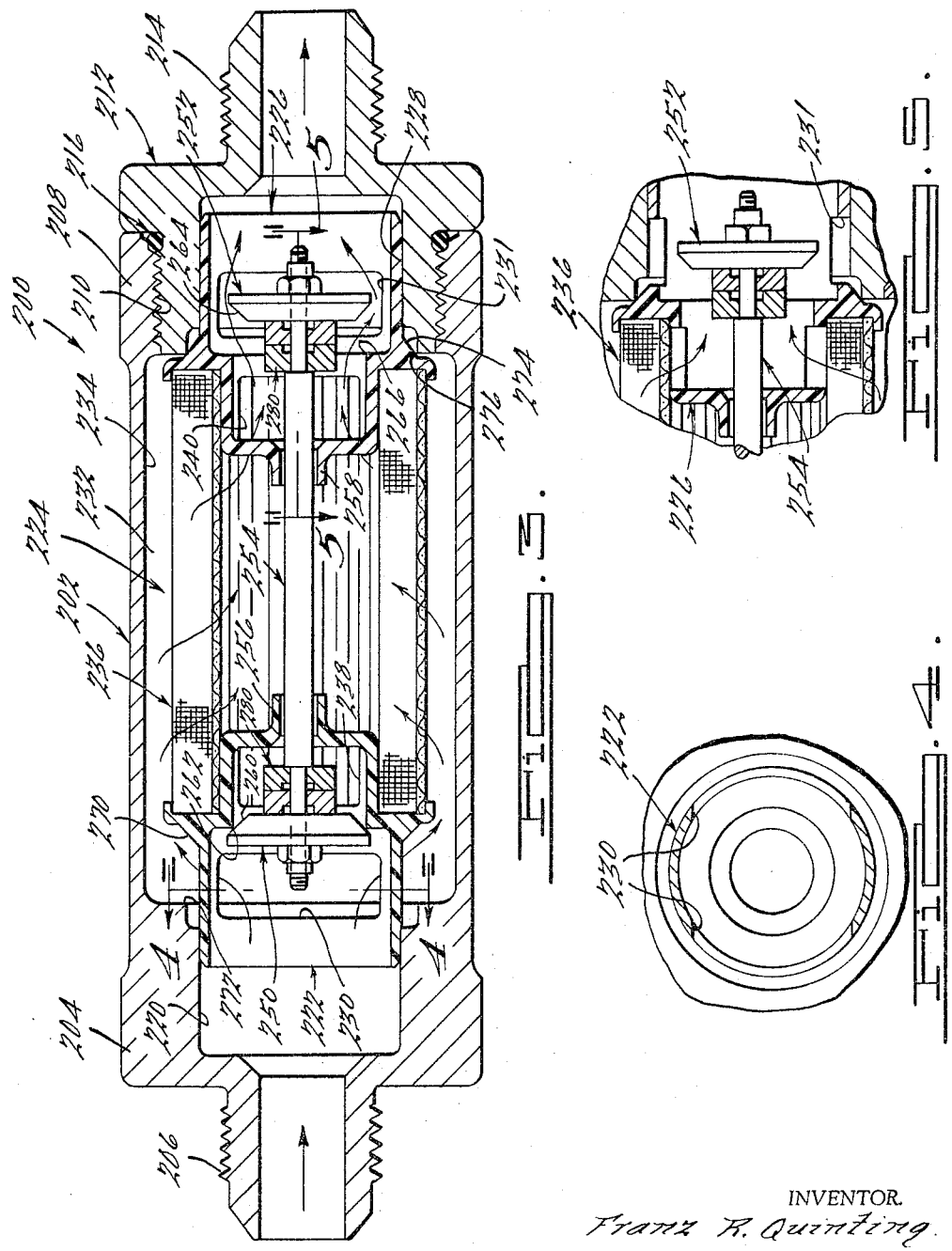

Patented Dec. 6, 1966

3,289,841
BIDIRECTIONAL FILTER
Franz R. Quinting, Clawson, Mich., assignor, by mesne assignments, to Michigan-Dynamics, Inc., Detroit, Mich., a corporation of Michigan
Filed Dec. 26, 1962, Ser. No. 247,120
6 Claims. (Cl. 210—134)

This invention relates generally to fluid filters and more particularly to a novel bidirectional fluid filter having provision for unidirectional flow through a filter element.

It is often desired to reverse the direction of fluid flow through a fluid system for short periods of time to effect, for example, braking of a fluid motor, reversal of a hydraulic actuator, etc. Thus, it is desirable in such fluid systems to employ a fluid filter that accommodates such flow reversal.

However, it is desirable in such reversible flow filters, that fluid flow through the filter element be unidirectional so that contaminants collected on one side of the filter element are not flushed off the element due to reversal of the fluid flow.

The bidirectional fluid filter of the instant invention exhibits a heretofore unknown degree of efficiency in maintaining unidirectional flow through a filter element. The bidirectional fluid filter features a novel free floating valve assembly having identical valves at opposite ends thereof that are maintained, selectively, in proper seating relationship relative to complementary valve seats on a filter housing so that fluid through the filter element of the filter is unidirectional irrespective of the direction of fluid flow through the filter.

Accordingly, one object of the instant invention is an improved fluid filter.

Another object is an improved bidirectional fluid filter.

Another object is a bidirectional filter wherein fluid flow is unidirectional through a filtering media.

Another object of the instant invention is a bidirectional fluid filter having a floating flow control valve.

Another object is a bidirectional fluid filter having a minimum number of moving components.

Other objects and advantages of the instant invention will be apparent in the following specification, claims and drawings wherein:

FIGURE 1 is a cross-sectional view of a bidirectional fluid filter in accordance with an exemplary constructed embodiment of the instant invention;

FIGURE 2 is a cross-sectional view taken substantially along the line 2—2 of FIGURE 1;

FIGURE 3 is a cross-sectional view of a modified form of bidirectional fluid filter in accordance with the instant invention;

FIGURE 4 is a cross-sectional view taken along the line 4—4 of FIGURE 3; and

FIGURE 5 is a cross-sectional view taken substantially along the line 5—5 of FIGURE 3.

As best seen in FIGURE 1 of the drawings, a bidirectional fluid filter 10, in accordance with an exemplary constructed embodiment of the instant invention, comprises a valve housing 12 of generally cylindrical configuration, having opposite end portions 14 and 16 with aligned internally threaded bores 18 and 20, respectively. A pair of end fittings 22 and 24, having externally threaded flanges 26 and 28 thereon, respectively, are threadably engaged with the end portions 14 and 16 of the housing 12. Suitable O-rings 30 and 32 effect a fluid seal between the housing 12 and the tube fittings 22 and 24, respectively. The end fittings 22 and 24 have externally threaded outer end portions 34 and 36 to facilitate attachment of conventional fluid conduits (not shown) to the fluid filter 10.

The housing 12 has a radially extending annular flange 40 thereon with a threaded internal bore 42 for the acceptance of an upper end portion 44 of a filter bowl 46. A suitable seal, for example, an O-ring 48, effects a fluid seal between the housing 12 and the filter bowl 46.

The flange 40 on the filter housing 12 has an annular flange 49 disposed radially inwardly of the threaded bore 42 thereof defining a seat for an upper end cap 50 of an annular filter element 52. The filter element 52 comprises, for example, a corrugated stainless steel screen. A seal, for example, an O-ring 54, effects a fluid seal between the end cap 50 and the annular flange 49 on the housing 12.

The filter bowl 46 has an upwardly extending boss 60 disposed centrally of a lower end portion 61 thereof for the acceptance of a lower end cap 62 on the filter element 52. A suitable seal, for example, an O-ring 64, effects a fluid seal between the end cap 62 and boss 60. The boss 60 on the filter bowl 46 also has a threaded bore 65 disposed centrally thereof for the acceptance of a lower end portion 66 of a magnet post 70. A plurality of magnets 72, for example, ceramic disc magnets, are stacked on the post 70 to attract and retain magnetizable particles not segregated from a fluid by the filter element 52.

The filter housing 12 has a central bore 80 extending coaxially with the threaded bores 18 and 20 for the slidable acceptance of a valve assembly designated generally by the numeral 81. The valve assembly 81 comprises a pair of slidable valve seats 82 and 84 made from, for example, nylon. The valve seats 82 and 84 are of generally cylindrical configuration having annular valve seating edges 86 and 88 thereon for seating a pair of truncated conical valves 90 and 92, respectively. The valves 90 and 92 are retained on opposite ends of a valve shaft 94 as by a pair of nuts 96 and 98, respectively.

The valves 90 and 92 and valve shaft 94 are guided for reciprocal movement within a pair of aligned bores 100 and 102 in the valve seats 82 and 84, respectively, by a pair of valve shaft guides 104 and 106. The guides 104 and 106 are slidably disposed in the bores 100 and 102 and serve to position the shaft 94 centrally thereof. As best seen in FIG. 2 of the drawings, the cross-sectional configuration of the guides 104 and 106 is such as to accommodate longitudinal fluid flow through the bores 100 and 102, as will be described. The valve guides 104 and 106 are normally biased away from one another and toward the valves 90 and 92, respectively, by a helical compression spring 108 which accommodates manufacturing tolerance deviations in the valve assembly 81.

The valve seat 82 is provided with a pair of oppositely directed truncated conical valve faces 110 and 112 that are seatable on complementary seating edges 114–116 on the end fitting 22 and housing 12, respectively. Similarly, the valve seat 84 is provided with a pair of truncated conical valve faces 118 and 120 that are seatable against complementary edges 122 and 124 on the housing 12 and end fitting 24, respectively, shown in FIGURE 1 of the drawings.

Fluid flow through the fluid filter 10, as shown in FIGURE 1, is through the fitting 24, thence downwardly through a passage 130 in the housing 12 into an annular chamber 132 between the filter bowl 46 and the filter element 52. Fluid then flows through the filter element 52 thence upwardly past the magnets 72 through a central bore 134 in the flange 49 of the housing 12. Fluid then flows through the bore 100 in the valve seat 82, past the valve 90, thence outwardly of the end fitting 22. It is to be noted that the pressure differential across the filter element 52 and therefore across the valve 92 and valve seat 84 is sufficient to bias the valve 92 against its complementary seating edge 88 in the valve seat 84 and the valve seat against its complementary seating edge 122 on the housing 12. Also, the valve face 110 on the seat 82 is biased against its complementary edge face 114 on the end fitting 22, tolerance deviation being accommodated by the spring 108 which is slightly compressed thereby biasing the guide 104 and valve seat 82 to the left.

Upon the occurrence of a flow reversal through the fluid filter 10, the valve 92 is initially biased to the right a first increment relative to the valve seat 84 due to the pressure differential across the valve 92. When the valve 90 seats against its complementary seating edge 86 on the valve seat 82, the fluid pressure differential thereacross biases both it and the valve seat 82 to the right, which movement is transmitted to the valve 92 as well as to the valve seat 84 through the spring 94 and a valve guide 106.

Thus, fluid entering through the fitting 22 immediately effects movement of the valve assembly 81 to the right thereby directing fluid flow through a downwardly extending aperture 124 in the housing 12, thence into the annular chamber 132 to effect radially inward flow of the fluid through the filter element 52.

From the foregoing description it should be apparent that fluid flow is always maintained radially inwardly through the filter element 52 irrespective of the direction of fluid flow through the housing 12 of the filter 10.

As best seen in FIGURES 3, 4, and 5 of the drawings a bidirectional fluid filter 200, in accordance with another embodiment of the instant invention, comprises a valve housing 202 of generally cylindrical configuration having an end portion 204 with an externally threaded portion 206 for the acceptance of a conventional, conduit fitting (not shown). An opposite end portion 208 of the housing 202 has an internally threaded portion 210 thereon for the acceptance of a complementary end fitting 212.

The end fitting 212 has an externally threaded portion 214 for the acceptance of a conventional conduit fitting (not shown. A suitable O-ring 216 effects a fluid seal between the housing 202 and the end fitting 212.

The end portion 204 of the housing 202 has an axially extending bore 220 therein for the acceptance of a generally cylindrical sleeve valve 222 that forms one end of a valve assembly, generally designated by the numeral 224. Similarly, an opposite end portion of the valve assembly 224 is defined by a generally cylindrical sleeve valve 226 that is slideably accepted in a complementary bore 228 in the end fitting 212.

The sleeve valves 222 and 226 have passages 230 and 231 therein, respectively, that communicate, selectively with an annular chamber 232 defined by an annular recess 234 in the housing 202 and an annular filter element 236. The sleeve valve 222 and 226 also have a pair of apertures 238 and 240 to accommodate fluid flow outwardly of the interior of the filter element 236.

The filter element 236 is substantially rigid and comprises, for example, a corrugated stainless steel screen, that extends between and is supported by the sleeve valves 222 and 226 of the valve assembly 224.

The valve assembly 224 has a pair of slideable valves 250 and 252 thereon that are supported on a shaft 254 that extends centrally of the filter element 236. The shaft 254 is guided for reciprocable movement longitudinally of the valve assembly 224 by complementary bearing flanges 256 and 258 on the sleeve valves 222 and 226.

The valve 250 has a truncated conical valve surface 260 that is engageable with an annular seating edge 262 on the sleeve valve 222 of the valve assembly 224. Similarly, the valve 252 has a truncated conical seating face 264 that is seatable on a complementary seating edge 266 on the sleeve valve portion 226 of the valve assembly 224.

The sleeve valve 224 has an annular truncated conical valve face 270 on an outer peripheral surface thereof that is engageable with a complementary seating edge 272 on the end portion 204 of the housing 202. Similarly, the opposite sleeve valve 226 has an annular truncated conical valve sleeve 274 thereon that is engageable with a complementary seating edge 276 on the end fitting 212.

It is also to be noted that a plurality of magnets 280 are mounted on the shaft 254 to attract and retain magnetizable particles not separated from a fluid by the filter element 236.

Thus, when the valve 250 is seated against its complementary seating edge 262, as shown in FIGURE 3 of the drawings, fluid entering through the end portion 204 of the housing 202 biases the entire valve assembly 224 to the right. Fluid passes radially outwardly through the aperture 230 in the sleeve valve 222 into the annular chamber 232 radially outwardly of the filter element 236. Fluid then passes radially inwardly through the filter element 236, through the aperture 240, in the sleeve valve 226, past the open valve 252 and outwardly of the end fitting 212.

Upon reversal of fluid flow, the valve 250 is biased to the left, due to the pressure differential thereacross, carrying the valve 252 to the closed condition relative to the sleeve valve 226. The pressure differential that then exists across the sleeve valve 226 then biases the entire valve assembly to the left until the valve face 270 on the sleeve valve 222 seats against its complementary seat 272 on the end 204 of the housing 202. Thus, flow reversal effects positive repositioning of the valve assembly 224 to insure that fluid flow is always radially inwardly of the filter element 236.

From the foregoing description it should be apparent that the bidirectional fluid filter of the instant invention meets the aforesaid requirements of bidirectional flow through the filter with unidirectional flow through the filter element without requiring complicated and costly valve arrangements. Equal filtration is provided in either direction of flow through the filter. Thus, the filter is ideally suited for use in hydraulic systems in which either the entire flow or a portion thereof is reversed from the normal direction of flow for short periods of time. Most important is the fact that contaminants are not flushed off the filter screen upon reversal of flow to the filter assembly.

In addition, the filter does not have specific inlet and outlet ports, thereby permitting the filter to be installed without reference to flow direction.

It should be noted that the entire valve assembly is free floating with identical parts on each end. Tolerance variations between the various parts are self-compensated.

It is to be understood that the specific constructions of the bidirectional filter herein disclosed and described are presented for the purpose of explanation and illustration and are not intended to indicate limits of the invention, the scope of which is defined by the following claims.

What is claimed is:
1. A bidirectional filter comprising
a housing having first and and second openings therein operable to function alternatively as inlets and outlets,
a filter element in said housing having an inlet side and a discharge side,
first and second passages connecting said first and second openings, respectively, to the inlet side of said filter element,
third and fourth passages connecting said first and second openings, respectively, to the discharge side of said filter element,
a differential pressure responsive valve assembly operable in one position to open said first and fourth passages and close said second and third passages,
said valve assembly having means automatically axially shiftable in response to a change in direction of fluid flow between said openings to close said first and fourth passages and open said second and third passages,
the automatic shifting of said valve assembly in response to a change in direction of fluid flow being operable to cause fluid to flow through said filter element in the same direction.

2. A bidirectional filter comprising
a housing having first and second openings therein operable in function alternatively as inlets and outlets,
a filter element in said housing having an inlet side and a discharge side,
first and second passages connecting first and second openings, respectively, to the inlet side of said filter element,
third and fourth passages connecting said first and second openings, respectively, to the discharge side of said filter element,
a differential pressure responsive valve assembly operable in one position to open said first and fourth passages and close said second and third passages, said valve assembly having
first and second pairs of coaxial valve elements, the valve elements of said first pair having openings therethrough forming parts of the passages connecting one side of said filter element to said housing openings, and a valve seat formed on each of the valve elements of said first pair engageable by said second pair valve elements to close said valve element openings,
said first and second pairs of valve elements being automatically axially shiftable in response to a change in direction of flow between said housing openings to close said first and fourth passage and open said second and third passages,
the automatic shifting of said valve elements in response to a change in direction of flow being operable to cause fluid to flow through said filter element in the same direction.

3. A bidirectional filter comprising
a housing having first and second openings therein operable to function alternatively as inlets and outlets,
a filter element in said housing having an inlet side and a discharge side,
first and second passages connecting said first and second openings, respectively, to the inlet side of said filter element,
third and fourth passages connecting said first and second openings, respectively, to the discharge side of said filter element,
a differential pressure responsive valve assembly operable in one position to open said first and fourth passage and close said second and third passages,
said valve assembly having first and second pairs of valve elements,
said first pair of valve elements having openings therein forming parts of said third and fourth passages, respectively, and valve seats surrounding said openings thereof,
said second pair of valve elements being engageable with said valve seats to close said apertures,
said valve elements being automatically axially shiftable in response to a change in direction of fluid flow between said housing openings to close said first and fourth passage and open said second and third passages whereby the automatic shifting of said valve assembly in response to a change in direction of current flow is operable to cause fluid to flow through said filter from the inlet side to the discharge side thereof irrespective of which of said housing openings is serving as the inlet.

4. The structure as set forth in claim 3, in which the valve elements of said second pair are connected for joint axial movement.

5. The structure set forth in claim 3 in which the valve elements of said second pair are connected for joint axial movement and the valve elements of said first pair are movable independently of one another.

6. The structure set forth in claim 3 in which said first pair of valve elements is exposed to fluid entering one of said housing openings so as to be biased by the pressure of fluid entering said housing from said opening, whereby one of the valve elements of said first pair is shifted axially in response to a reversal in the flow of fluid through said housing to initiate complete shifting of said valve assembly.

References Cited by the Examiner
UNITED STATES PATENTS
218,351  8/1879  Weed _____ 210—427

REUBEN FRIEDMAN, *Primary Examiner.*

F. W. MEDLEY, *Examiner.*